(12) United States Patent
Maier et al.

(10) Patent No.: US 11,333,488 B2
(45) Date of Patent: May 17, 2022

(54) METHOD AND DEVICE FOR CONTACTLESS AND NON-DESTRUCTIVE DETERMINATION OF THE LAYER THICKNESSES OF LACQUER LAYERS OF VEHICLE PARTS

(71) Applicants: MOTHERSON INNOVATIONS COMPANY LIMITED, London (GB); flo-ir (Florin Infrarot) GmbH, Oberdorf (CH)

(72) Inventors: Simon Maier, Breitenbrunn (DE); Bettina Posler, Wettstetten (DE); Johannes Riehs, Wolnzach (DE); Harald Wagner, Neustadt/Donau (DE); Christian Florin, Ennetbürgen (CH)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/598,608

(22) Filed: Oct. 10, 2019

(65) Prior Publication Data

US 2020/0116474 A1 Apr. 16, 2020

(30) Foreign Application Priority Data

Oct. 15, 2018 (EP) .................................... 18200440

(51) Int. Cl.
*G01B 9/02091* (2022.01)
*G01B 11/06* (2006.01)
(52) U.S. Cl.
CPC ...... *G01B 11/0633* (2013.01); *G01B 9/02091* (2013.01); *G01B 11/0675* (2013.01)

(58) Field of Classification Search
CPC ............ G01B 11/0675; G01B 11/0633; G01B 11/0616; G01B 9/02091; G01B 9/02007; G01B 9/02029; G01B 9/02031
See application file for complete search history.

(56) References Cited

U.S. PATENT DOCUMENTS 6,495,833 B1 * 12/2002 Alfano ............... G01N 21/4795
250/330
2005/0046874 A1 * 3/2005 Caton .................... G01B 7/105
356/630

(Continued)

FOREIGN PATENT DOCUMENTS

DE       43 25 767 A1    2/1995
EP       1 326 059 A1    7/2003

(Continued)

OTHER PUBLICATIONS

European Search Report dated Mar. 15, 2019 with respect to counterpart European patent application 18 200 440.

(Continued)

*Primary Examiner* — Jonathan M Hansen
(74) *Attorney, Agent, or Firm* — Ursula B. Day, Esq.

(57) ABSTRACT

A method for contactless and non-destructive determination of the layer thicknesses of lacquer layers of vehicle parts is disclosed. In addition, the invention relates to a device to determine and measure the lacquer layers of vehicle part, the device constructed for performing optical coherence tomography and includes at least one radiation source for providing electromagnetic radiation and the electromagnetic radiation provides a wavelength ($\lambda$) of 100 nm-15·10³ nm and in particular 380 nm to 800 nm.

6 Claims, 2 Drawing Sheets

(56) References Cited

U.S. PATENT DOCUMENTS

2008/0214729 A1* 9/2008 Buter ............... C08G 18/6674
　　　　　　　　　　　　　　　　　　524/591
2011/0094444 A1　4/2011 Haas et al.

FOREIGN PATENT DOCUMENTS

| EP | 2 262 590 B1 | 12/2010 |
| WO | WO 99/44011 | 9/1999 |
| WO | WO 2017/168181 A1 | 10/2017 |

OTHER PUBLICATIONS

Translation of European Search Report dated Mar. 15, 2019 with respect to counterpart European patent application 18 200 440.
Yue Dong et al.: "Nondestructive analysis of automotive paints with spectral domain optical coherence tomography", Applied Optics, vol. 55, No. 13, May 1, 2016, p. 3695.

* cited by examiner

METHOD AND DEVICE FOR CONTACTLESS AND NON-DESTRUCTIVE DETERMINATION OF THE LAYER THICKNESSES OF LACQUER LAYERS OF VEHICLE PARTS

CROSS-REFERENCES TO RELATED APPLICATIONS

This application claims the priority of German Patent Application, Serial No. 18 200 440.8, filed Oct. 15, 2018, pursuant to 35 U.S.C. 119(a)-(d), the disclosure of which is incorporated herein by reference.

BACKGROUND OF THE INVENTION

The present invention relates to a method and a device for contactless and non-destructive determination of the layer thicknesses of lacquer layers of vehicle parts.

Nothing in the following discussion of the state of the art is to be construed as an admission of prior art.

The demands on the quality of vehicle parts continue to increase, including in terms of their visual appearance. At the same time, efforts are being made to produce the vehicle parts with minimal use of resources. Painting the vehicle parts has therefore become extremely important. Painting should, on the one hand, provide adequate coverage, so that the particular vehicle part makes a strong and consistent impression from any viewing angle and under all lighting conditions. On the other hand, the lacquer layers of the paint should be as thin as possible so as to keep the quantity of the used paints small.

In the course of efforts to automate driving and to allow autonomous driving, the detection of the surroundings of the vehicle plays a critical role. Also precursors of autonomous driving, such as driver assistance systems, are based on the detection of the surroundings of the vehicle. Examples of such driver assistance systems are distance controls or lane departure assistants. For detecting the environment of the vehicle, inter alia radar beams are used. However, the layer thickness of the coating, in particular of metallic coatings, affects the attenuation of radar beams, such that a constant layer thickness is a prerequisite for reproducible detection of the surroundings of the vehicle represents and obviates the need for individual and time-consuming calibration of the respective radar sensors.

The layer thickness of the coating can be adjusted, for example, by using a capacitive or magnetic-inductive layer thickness measurement. However, these measuring methods presume an electric or magnetic permeability of the vehicle part on which the coating is applied. The layer thickness of a coating that is applied to vehicle parts made of plastic can hitherto not yet be determined with such measuring methods. Another disadvantage is that only the total layer thickness of the coatings can be determined with such measurement methods. However, since modern coatings have at least two, but typically three or four layers, a determination of the total layer thickness is only partially useful because each layer must have a respective thickness in a prescribed range, in order to be able to satisfy the demands on the quality of the coating, in particular on the visual appearance, the weather resistance and the mechanical stability, even when the total layer thickness is in the designated range.

Coating systems with a measuring device for determining the total layer thickness of a coating are disclosed, for example, in EP 2 262 590 A1. Measuring devices for determining the total layer thickness of a coating are described in WO 99/44011. A method for determining the properties of a multilayer structure is known from EP 1 326 059 A1.

The proportion of vehicle parts made of plastic continues to increase. Advantages of plastic include, inter alia, its low weight and its corrosion resistance. Because of the good formability, a mechanical posttreatment is often not required. However, the surface of the vehicle parts made of plastic is susceptive to abrasion, weathering, or certain chemicals. The surfaces can be damaged at the slightest touch, thus losing their original shine. To prevent this phenomenon, plastics are coated with different varnish layers. To sufficiently protect the vehicle parts made of plastic against the aforementioned external influences, the various varnish layers must have the required layer thicknesses.

SUMMARY OF THE INVENTION

According to one aspect of the present invention, a method is provided which enables in a simple manner a determination of the layer thickness of each varnish layer of a coating that has at least two varnish layers. Furthermore, another aspect of the present invention is an embodiment of a device which is constructed to carry out the afore-stated method.

These aspects and others are attained with the features and further advantageous embodiments as follows:

In one embodiment of the present invention method is disclosed for contactless and non-destructive determination of the layer thicknesses of lacquer layers of vehicle parts, wherein a first lacquer layer having a first layer thickness is applied to the vehicle part, and at least one additional lacquer layer applied to the first lacquer layer and having another layer thickness, wherein at least the additional lacquer layer or one of the additional lacquer layers is optically opaque, determining at least the additional lacquer layer with a device constructed for performing optical coherence tomography, wherein the device includes at least one radiation source for providing electromagnetic radiation and the electromagnetic radiation provides a wavelength of $100\text{-}15 \cdot 10^3$ nm and in particular 380 to 800 nm.

Optical coherence tomography has hitherto not been used for the determination of vehicle parts that are provided with the coatings having several lacquer layers. Electromagnetic radiation with a wavelength of 380 to 800 nm in the visible range, so that such electromagnetic radiation is generally referred to as light beams. The use of optical coherence tomography in this wavelength range for determining the layer thicknesses of transparent layers is known. However, since the vehicle parts are only in exceptional situations provided with transparent lacquer layers, the use of optical coherence tomography for determining the layer thickness of colored, visually opaque lacquer layers, in particular by using a wavelength of 380 to 800 nm has not been contemplated.

An important realization for the feasibility of the present method is the use of optically opaque and/or transparent lacquer layers. As already discussed, the determination of the layer thicknesses of transparent lacquer layers using a wavelength of 380 to 800 nm poses no problem. However, when using opaque lacquer layers that are opaque to light beams, optical coherence tomography cannot be performed when using a wavelength of 380 to 800 nm. An optically opaque lacquer layer refers to a lacquer layer, where the apparent color, for example yellow, is also seen as yellow. An optically non-opaque lacquer layer is present, when the background shows through, i.e. when the apparent color, for example yellow, is perceived only as a mixture of the color yellow and the color of the underlying first opaque layer, for example, gray, black or white. Characteristic of the color yellow a strong green tint with a gray primer. In addition, the brightness is altered depending on the background color. An optically opaque lacquer layer is still partially transparent for the light beams of the respective wavelength. Such optically opaque lacquer layer can for example be created by incorporating microscopic point-like color pigments in a plastic matrix, which provide in spite of the above-described color effect still sufficient transparency for light beams. Surprisingly, the optical coherence tomography can therefore still be used for the determination of layer thicknesses of optically covering lacquer layers, even when visible beams are used.

The use of light beams has the advantage that these are visible for the user of the device without generally posing a risk. In the event that laser beams are used, suitable protective measures can be taken, which can be comparatively easily implemented. Moreover, providing light beams is comparatively simple and the radiation source is inexpensive. Furthermore, the layer thicknesses of the respective coatings can be determined with optical coherence tomography contactless and destruction-free. This provides the opportunity to use the proposed method for quality control in mass production of vehicle parts. The quality control can consequently be performed in series production without significant time overhead.

Several additional lacquer coats are usually used in typical coatings, wherein in most cases, the lacquer layer applied on the first lacquer layer, i.e. the lower of the additional lacquer layers is optically opaque. The upper of the additional lacquer layers is a transparent lacquer layer, also referred to as a clear coat.

In another embodiment, a first radiation source with a first wavelength is provided and the layer thickness is determined by means of optical coherence tomography and the refractive indices of the individual lacquer layers. For performing optical coherence tomography, it is necessary to determine the refractive index of the lacquer layer whose layer thickness to be determined. The refractive index of the lacquer layers will generally be known, but it can also be determined using the optical coherence tomography before measuring the actual layer thickness.

According to another embodiment, the first layer thickness and/or the additional layer thickness are measured using a first radiation source and a second radiation source, wherein the first radiation source provides electromagnetic radiation at a first wavelength and the second radiation source provides electromagnetic radiation at a second wavelength.

When preparing the lacquers, the lacquer is often tinted in multiple steps with varying amounts of color pigments in order to compensate for variations in the quality of the raw materials. Consequently, the formulation of the relevant lacquer is subject to fluctuations with each batch, which also causes changes in the refractive index n of a particular lacquer layer. By using at least two light sources with different wavelengths, with each of them providing a suitable reflected signal, the refractive index of a layer that depends only on the material can be eliminated from the equation for the layer thickness. A color-dependent calibration with the refractive index of the respective color, for example n (blue lacquer)=1.21065, which can be stored in the measuring device, therefore becomes unnecessary.

In another embodiment, the first layer thickness and/or the additional layer thickness can be determined by using a third radiation source, wherein the third radiation source provides electromagnetic radiation at a third wavelength. Especially for very dark or black lacquer layers, almost all the light in the visible region is absorbed. Therefore, the radiation provided by the third radiation source has a third wavelength which is in particular outside the visible range, for example ultraviolet or infrared radiation.

Depending on the color of the lacquer layer whose thickness is to be determined, interactions between the color pigments and the light beams may occur. This can prevent reflection at the interfaces. For example, a blue lacquer layer absorbs yellow light, i.e. light of the complementary color, while reflecting light beams of the other wavelengths. When the selected wavelength of the light beams is also in the yellow region, no further determination of the layer thickness can be carried out. Such situations can be avoided by determining the layer thicknesses with light beams having different wavelengths.

In the case of metallic finishes, in addition to the color pigments, other, usually platelet-shaped pigments are added which cause the metallic effect. For example, aluminum flakes are added to the lacquer layer for creating a metallic effect and ground mica platelets for creating a pearlescent effect. On these additives, the light beams can be reflected or refracted in an indeterminate manner, so that a uniform radiation front is no longer present and the optical coherence tomography does not yield useful results. However, this type of reflection and/or refraction occurs only at certain wavelengths. One of the two wavelengths can therefore be selected so that the light beams are not refracted or reflected at such additives.

In addition, a redundancy is created in the event that one of the light sources should fail. In addition, two independent measurement results are obtained, allowing mutual control of the measurement results.

As mentioned above, the light beams are completely or almost completely absorbed in black or dark lacquer layers. In the event that the first, the second and the third wavelength are in the visible region, the layer thicknesses of black or dark lacquer layers are difficult to determine with optical coherence tomography and with light beams. For this reason, another measurement method is used in this embodiment which is independent of the optical coherence tomography and with which at least the total thickness of the coating can be determined. In the event that, for example, the coating has a black lacquer layer and a transparent lacquer layer applied thereon, the layer thickness of the black coating may be determined by subtracting the thickness of the transparent layer from the total thickness. A prerequisite for the dielectric, capacitive or magnetic-inductive layer thickness measurement is that the vehicle part is electrically conductive. The process according to this embodiment can thus be applied without problems on chassis parts, which are usually made of sheet metal.

In another embodiment, the device may include a measuring device for performing a dielectric, capacitive or magnetic-inductive layer thickness measurement and the vehicle part may be made of plastic or may include a plastic layer on which the first lacquer layer is applied, wherein at least one the lacquer layers is electrically conductive and at least the cumulative thickness of the other layers disposed above the electrically conductive layer is determined with the measuring device.

As mentioned above, electric conductivity is necessary for performing a dielectric, capacitive or magnetic-inductive layer thickness measurement. In this embodiment, at least one of the lacquer layers is electrically conductive, which allows a dielectric, capacitive or magnetic-inductive layer thickness measurement to be performed. The particular lacquer layer can be made electrically conductive, for example, by addition of electrically conductive particles such as soot particles. The addition of soot particles has the additional effect of enhancing the strength of the respective coating.

The term "layers above the electrically conductive layer" refers to the electrically non-conductive layers located between the electrically conductive layer and the free surface of the coating. By using the dielectric, capacitive or magnetic-inductive layer thickness measurement, the distance from the free surface of the coating to the first electrically conductive layer can be measured. When the first electrically conductive layer is the first lacquer layer and the coating has otherwise no further electrically conductive lacquer layers, the cumulative layer thickness of the additional lacquer layers disposed on the first lacquer layer can be determined. When the individual layer thicknesses of the remaining lacquer layers are determined using optical coherence tomography, another value is obtained with the dielectric, capacitive or magnetic-inductive layer thickness measurement, which enables checking the plausibility of the thickness values measured with the optical coherence tomography. When the optical coherence tomography cannot be used for determining the layer thicknesses of the other lacquer layers, for example due to the characteristics of the lacquer, the dielectric, capacitive or magnetic-inductive layer thickness measurement may be used as an alternative.

An embodiment of the invention relates to a device for contactless and non-destructive determination of the layer thicknesses of lacquer layers of vehicle parts, which is constructed for performing the method according to any one of the aforedescribed embodiments.

The technical effects and advantages that can be achieved with the proposed device correspond to those discussed above for the present process. In summary, it should be pointed out that it is possible by using light beams to determine the layer thicknesses not only of transparent lacquer layers but also of optically opaque lacquer layers. Providing light beams and handling of light beams are comparatively uncomplicated for a user of the device.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
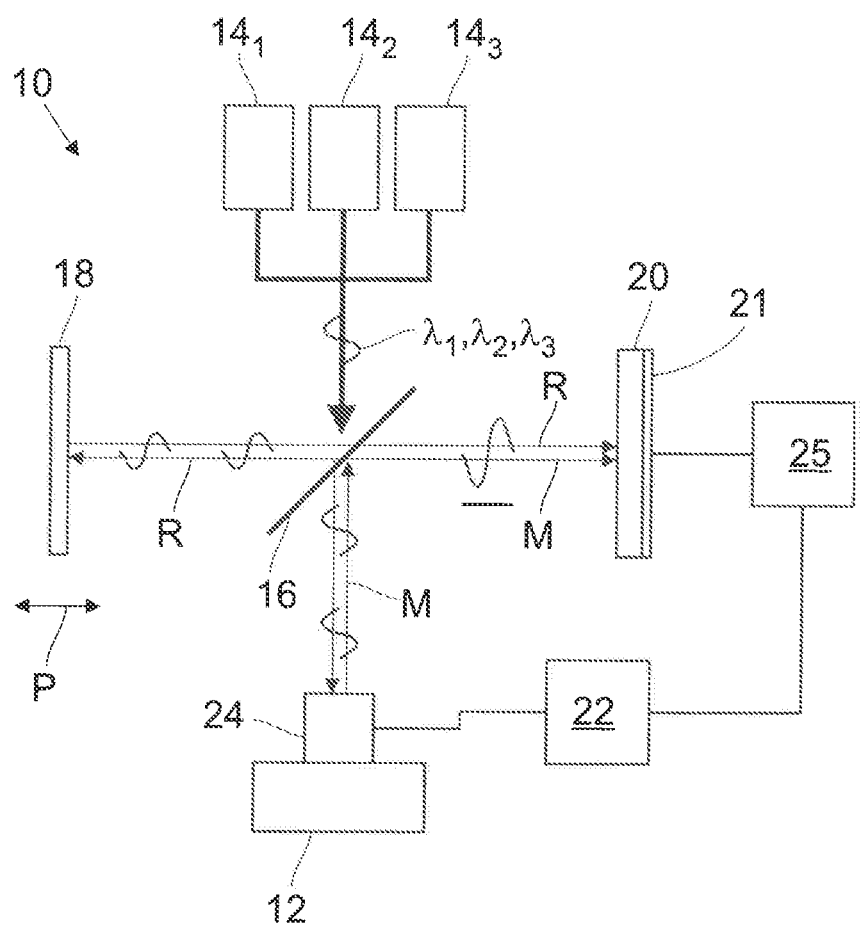
FIG. 1 is a schematic diagram of a device for contactless and non-destructive determination of the layer thicknesses of lacquer layers of vehicle parts according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of an exemplary embodiment of an inventive device 10 for contactless and non-destructive measurement of the layer thicknesses of lacquer layers of vehicle parts 12. In the illustrated exemplary embodiment, the device 10 includes a first radiation source $14_1$, a second radiation source $14_2$ and a third radiation source $14_3$ which are formed in this case to provide light beams, wherein the first radiation source $14_1$, emits light beams having a first wavelength $\lambda_1$, the second radiation source $14_2$ emits light beams having a second wavelength $\lambda_2$ and the third radiation source $14_3$ emits light beams having a third wavelength $\lambda_3$. The wavelengths $\lambda_1$ to $\lambda_3$ are in the visible range, i.e. between 380 and 800 nm; however, the wavelength $\lambda_1$ to $\lambda_3$ may also be selected to lie outside the visible region, for example in the ultraviolet or infrared range. The light beams emitted from the radiation sources $14_1$ strike a beam splitter 16, which has an unillustrated prism and which divides the light beams into reference beams R, which are reflected onto a mirror 18, and into measuring beams M, which are steered to a vehicle part 12. The distance between the mirror 18 and the beam splitter 16 may be adjusted with an unillustrated adjusting device, as indicated by the arrow P.

The reference beams R impinge perpendicularly on the mirror 18 and are hence retroreflected by the mirror 18 in the opposite direction. The measuring beams M steered onto the vehicle part 12 also impinge perpendicularly on the surface of the vehicle part 12 and are hence also retroreflected by the vehicle part 12 in the opposite direction. While the reference beams R reflected by the mirror 18 pass through the beam splitter 16 without changing direction, the measuring beams M reflected by the part vehicle 12 are deflected by the beam splitter 16 so as to thereafter propagate parallel to the reference beams R reflected by the mirror 18. Subsequently, the measuring beams M and the reference beams R impinge on a detector 20 which has an array 21 of active pixel sensors (APS).

Furthermore, the device 10 has a measuring device 22 constructed to perform a dielectric, capacitive or magnetic-inductive coating thickness measurement. The device 10 includes a measuring head 24, which may be constructed from of a rubber material that protects the vehicle part 12. With the measuring head 24, the measuring beams M can be directed perpendicular onto the vehicle part 12. In addition, the physical quantities used to perform the dielectric, capacitive or magnetic-inductive coating thickness measurement can be introduced into the vehicle part 12 with the measuring head 24.

The signals generated by the detector 20 and the measuring device 22 are analyzed and processed by an evaluation unit 25 using suitable algorithms stored in the evaluation unit 25.

Figure 2:
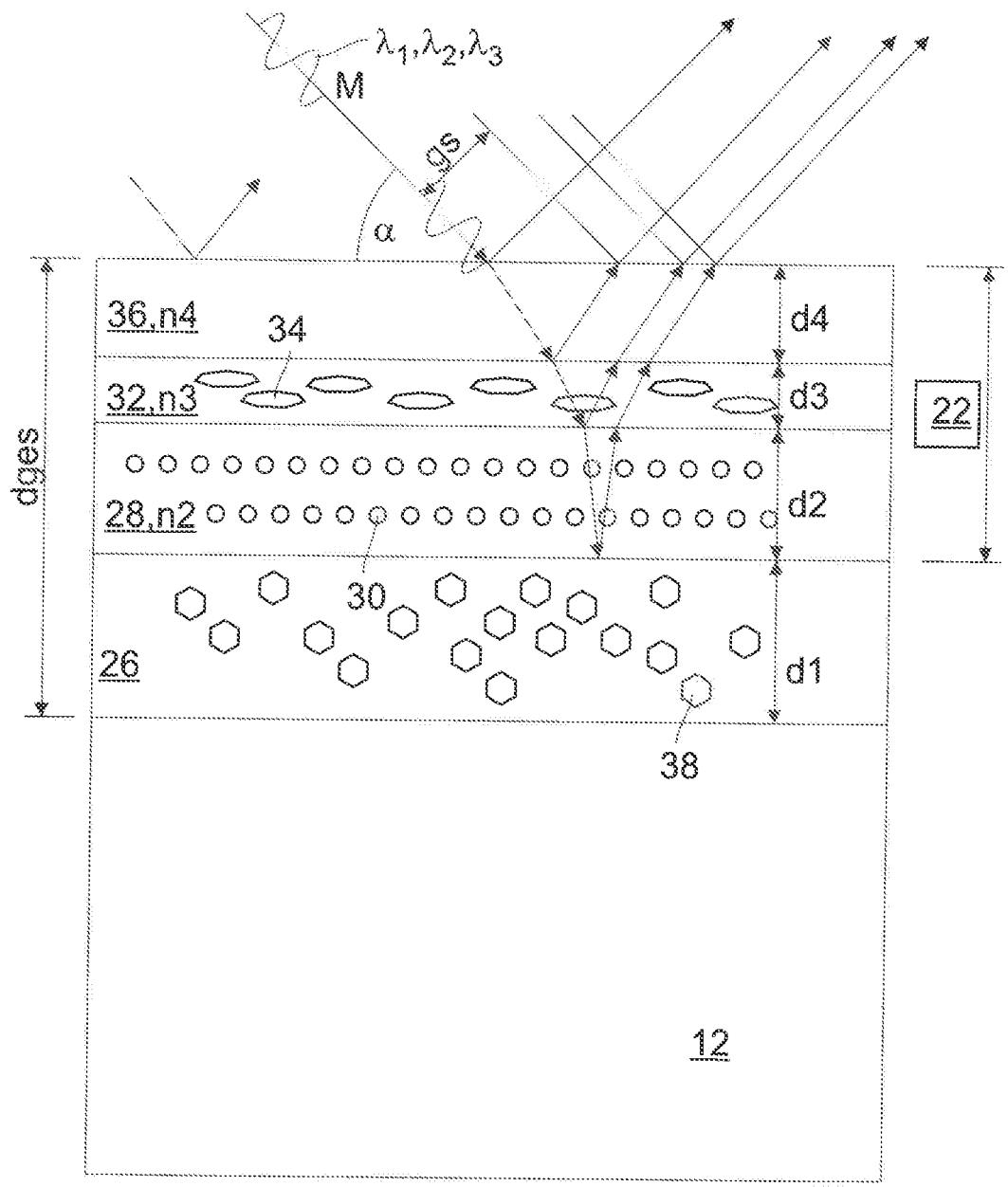
FIG. 2 is a schematic diagram describing the method according to the invention.

FIG. 2 shows the vehicle part 12 in more detail in form of a schematic diagram. The vehicle part 12 itself can have an arbitrary shape and shall in the illustrated example be made of plastic or have at least a (not separately illustrated) plastic layer. Alternatively, the vehicle part 12 may also be made of metal, for example in the form of a metal sheet, as is customary for vehicle chassis.

A first lacquer layer 26 with a first layer thickness d1 is applied on the vehicle part 12. The first lacquer layer 26 is usually an electrically conductive base layer and is often referred to as a primer. Several additional lacquer layers are applied on top of the first lacquer layer 26, in this case a total of three additional lacquer layers 28, 32, 36. A second lacquer layer 28 with a second layer thickness d2 is applied on the first lacquer layer 26, which is often referred to as a basecoat. The second lacquer layer 28 includes color pigments 30 embedded in an unillustrated plastic matrix which give the vehicle part 12 the desired color. The second lacquer layer 28 is optically opaque and permeable to light beams. A third lacquer layer 32 with a third layer thickness d3 is applied on the second lacquer layer 28, which is in this case formed as a pearlescent coating and includes flake-shaped pigments 34 for generating a pearlescent effect. A transparent fourth lacquer layer 36 implemented as a transparent clear coat and having a fourth layer thickness d4 is applied on the third lacquer layer 32.

As mentioned before, the coating illustrated in FIG. 2 is a pearlescent coating which is only rarely applied. In the much more frequently encountered uni-coatings or metallic coatings (not shown), the second lacquer layer 28 and the third lacquer layer 32 are combined to a common layer so that a total of two additional lacquer layers are applied on the first lacquer layer 26. The upper of the additional lacquer layers is once more a transparent lacquer layer.

FIG. 2 illustrates schematically the physical effect used with optical coherence tomography. For clarification, the measuring beams M in FIG. 2 are shown as being incident on the fourth lacquer layer 36 at an angle α, although they actually impinge during the measurement as described with reference to FIG. 1 perpendicularly on the vehicle part 12. However, it is not absolutely necessary that the measuring beams M impinge on the vehicle part 12 perpendicularly, as shown in FIG. 1. However, this increases the amount of reflected light, which significantly improves the measurement accuracy of the layer thicknesses, in particular of dark lacquer layers, or makes it possible in the first place to determine the layer thicknesses.

A part of the measuring beams M is absorbed, reflected or refracted at each boundary layer between the lacquer layers 26, 28, 32, 36. The refractive index, in this case the refractive indices n2 and n4, and the propagation time of the measuring beams M in the second, third and fourth lacquer layer 28, 32, 36 are measured. The measuring beams M and the reference beams R interfere with each other in the beam splitter 16. Only photons from the same light source can interfere at the beam splitter 16. A path difference gs can calculated based on the interference. The path difference gs depends on the layer thicknesses d2, d3, d4 and the refractive indices n2 to n4 of the second, third and fourth lacquer layers 28, 32, 36.

As is apparent from FIG. 2, the second layer thickness d2, the third layer thickness d3 and the fourth layer thickness d4 can be determined with optical coherence tomography. The more lacquer layers are present, the greater is the absorbed part of the measuring beam M and the weaker are the measuring beams M reflected by the lower lacquer layers, so that from a certain number of lacquer layers on, the layer thickness of the lower lacquer layers can no longer be determined. Therefore, in the illustrated example, the layer thickness d1 of the first lacquer layer 26 is in a different way, namely with the measuring device 22, which performs a dielectric, capacitive or magnetic-inductive layer thickness measurement. In order to determine the first layer thickness d1 of the first lacquer layer with a dielectric, capacitive or magneto-inductive layer thickness measurement, the first lacquer layer 26 and/or the base, i.e. the vehicle part 12, must be electrically conductive. For this purpose, the first lacquer layer 26 may be provided with electrically conductive particles 38, in this case with soot particles. Because in the illustrated example the vehicle part 12 is made of plastic, the vehicle part 12 alone can in general not provide the electrical conductivity. However, with the dielectric, capacitive or magnetic-inductive layer thickness measurement, the distance between the free surface of the coating and the electrically conductive first lacquer layer 26 can be measured by way of the dielectric, capacitive or magnetic-inductive layer thickness measurement. In the event that the first lacquer layer 26 is not electrically conductive, the distance between the free surface of the coating and the electrically conductive vehicle part 12 can be determined.

In the illustrated exemplary embodiment, it will be assumed that the first lacquer layer 26 is electrically conductive due to the addition of soot particles. In this exemplary embodiment, the total layer thickness dges of the coating cannot be determined with the dielectric, capacitive or magneto-inductive layer thickness measurement. However, information can be obtained about the sum of the second, third and fourth layer thicknesses d2 to d4 which can then be compared with the values determined by optical coherence tomography. The determined values can therefore be checked for plausibility.

For the unillustrated case where the first lacquer layer 26 is not electrically conductive, but the vehicle part 12 is electrically conductive, the total layer thickness edges can be determined with the dielectric, capacitive or magnetic-inductive layer thickness measurement. Since the second, third and fourth layer thickness d2 to d4 can be determined using optical coherence tomography, the first layer thickness d1 can be determined based on a subtraction d1=dges−d2−d3−d4.

The two measurement methods can be performed independently and do not affect each other. With the exception of placing the measuring head 24 on the vehicle part 12, the two measurement methods are performed contactless, without damaging or destroying the vehicle part 12.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for contactless and non-destructive determination of a layer thickness of lacquer layers of a vehicle part, wherein a first lacquer layer is applied to a vehicle part, said first layer being electrically conductive, and at least an additional lacquer layer is applied to the first lacquer layer, said additional layer having an additional layer thickness, said vehicle part made of plastic or comprising a plastic layer on which the first lacquer layer is applied, the method comprising the steps of, determining the at least one additional layer thickness by performing optical coherence tomography with a device constructed for performing optical coherence tomography, determining the additional layer thickness by dielectric, capacitive or magnetic-inductive layer thickness measurement with the measuring device, wherein the device includes at least one radiation source for providing electromagnetic radiation of a wavelength from 100 nm to $15 \times 10^3$ nm, comparing the additional layer thickness determined by dielectric, capacitive or magneto-inductive layer thickness measurement with the values determined by optical coherence tomography and checking for plausibility.

2. A method for contactless and non-destructive determination of a layer thickness of lacquer layers of a vehicle part, the vehicle part is electrically conductive, wherein a first lacquer layer is applied to a vehicle part, said first layer having a first layer thickness, and at least an additional lacquer layer is applied to the first lacquer layer, said additional layer having an additional layer thickness, the method comprising the steps of, determining the additional layer thickness of said at least one additional lacquer layer of the vehicle part by performing optical coherence tomography with a device constructed for performing optical coherence tomography, determining a total layer thickness by dielectric, capacitive or magneto-inductive layer thickness measurement with the measuring device, wherein the device includes at least one radiation source for providing electromagnetic radiation of a wavelength from 100 nm to $15 \times 10^3$ nm, determining the first layer thickness by subtracting the additional layer thickness from the total layer thickness.

3. The method according to claim 2, wherein said additional lacquer layer is optically opaque for the human eye at a wavelength range from 380 nm to 800 nm and wherein the additional layer thickness is determined by performing optical coherence tomography at a wavelength range from 380 nm to 800 nm with a device constructed for performing optical coherence tomography at a wavelength range from 380 nm to 800 nm.

4. A device for the contactless and non-destructive determination of a layer thickness of lacquer layers of a vehicle part, wherein either the vehicle part is electrically conductive and a first lacquer layer is applied to a vehicle part, said first layer having a first layer thickness, and at least an additional lacquer layer is applied to the first lacquer layer, said additional layer having an additional layer thickness, or the vehicle part is made of plastic or comprising a plastic layer on which a first lacquer layer is applied, the first layer being electrically conductive, at least an additional lacquer layer to the first lacquer layer, said additional layer having an additional layer thickness, the device comprising,
a radiation source providing radiation of differing wavelength in a range from 100 nm to $15 \times 10^3$ nm for performing optical coherence tomography,
a splitter for splitting the respective radiation ranges from the radiation source into reference beams and measuring beams,
wherein the measuring beams and the parallel reference beams are captured by a detector, and
a measuring device constructed to perform a dielectric, capacitive or magnetic-inductive layer thickness measurement, and
an evaluation unit where the signals generated by the detector and the measuring device are processed by suitable algorithms.

5. The device according to claim 4, wherein said additional lacquer layer is optically opaque for the human eye at a wavelength range from 380 nm to 800 nm and the radiation source provides radiation on a range from 380 nm to 800 nm.

6. The method according to claim 1, wherein said additional lacquer layer is optically opaque for the human eye at a wavelength range from 380 nm to 800 nm and wherein the additional layer thickness is determined by performing optical coherence tomography at a wavelength range from 380 nm to 800 nm with a device constructed for performing optical coherence tomography at a wavelength range from 380 nm to 800 nm.

* * * * *